(12) United States Patent
Russell et al.

(10) Patent No.: US 10,909,776 B2
(45) Date of Patent: Feb. 2, 2021

(54) IRRIGATION SPRINKLER HEAD TESTER

(71) Applicants: Justin Todd Russell, Ashville, OH (US); Christopher Rodney Stottsberry, Dalzell, SC (US)

(72) Inventors: Justin Todd Russell, Ashville, OH (US); Christopher Rodney Stottsberry, Dalzell, SC (US)

( * ) Notice: Subject to any disclaimer, the term of this patent is extended or adjusted under 35 U.S.C. 154(b) by 189 days.

(21) Appl. No.: 16/229,295

(22) Filed: Dec. 21, 2018

(65) Prior Publication Data

US 2019/0197793 A1 Jun. 27, 2019

Related U.S. Application Data

(60) Provisional application No. 62/593,190, filed on Dec. 26, 2017.

(51) Int. Cl.
*G07C 3/00* (2006.01)
*B05B 15/00* (2018.01)
*B05B 14/30* (2018.01)
*B05B 9/04* (2006.01)

(52) U.S. Cl.
CPC ............. *G07C 3/00* (2013.01); *B05B 9/0403* (2013.01); *B05B 14/30* (2018.02); *B05B 15/00* (2013.01)

(58) Field of Classification Search
CPC ......... G07C 3/00; B05B 9/0403; B05B 15/00; B05B 14/30
See application file for complete search history.

(56) References Cited

U.S. PATENT DOCUMENTS

| | | | | |
|---|---|---|---|---|
| 4,712,421 A * | 12/1987 | Young | .................... | F02M 65/00 73/114.45 |
| 6,053,037 A * | 4/2000 | Kojima | ................... | B05B 15/00 73/114.46 |
| 6,286,765 B1 * | 9/2001 | Byles | ................... | A01G 25/165 239/1 |
| 2010/0224810 A1 * | 9/2010 | Bakke | ................... | F16K 31/084 251/129.15 |

* cited by examiner

*Primary Examiner* — David Z Huang
(74) *Attorney, Agent, or Firm* — Melissa B. Neely

(57) ABSTRACT

The invention disclosed in this application is a device to individually test irrigation sprinkler heads. The invention is comprised of a cabinet with a water reservoir and submersible pump. The submersible pump is located in water reservoir in the bottom of the cabinet. The top section of the cabinet is equipped with doors with transparent panels to observe the sprinkler head as it is being tested.

2 Claims, 5 Drawing Sheets

IRRIGATION SPRINKLER HEAD TESTER

STATEMENT REGARDING FEDERALLY SPONSORED RESEARCH OR DEVELOPMENT

This invention was not made by an agency of the United States Government nor under a contract with an agency of the United States Government.

CROSS REFERENCE TO RELATED APPLICATIONS

Provisional Patent Application No. 62/593,190
Filing Date: Dec. 26, 2017
Relationship: Provisional application was for same invention.

THE NAME OF THE PARTIES TO JOINT RESEARCH AGREEMENT

Not Applicable.

INCORPORATION BY REFERENCE OF MATERIAL SUBMITTED ON A COMPACT DISC OR AS A TEXT FILE VIA THE OFFICE ELECTRONIC FILING SYSTEM (EFS-WEB)

Not Applicable.

STATEMENT REGARDING PRIOR DISCLOSURES BY THE INVENTOR OR A JOINT INVENTOR

Provisional Patent Application No. 62/593,190
Filing Date: Dec. 26, 2017
Relationship: Provisional application was for same invention.

SEQUENCE LISTING

Not Applicable

BACKGROUND OF THE INVENTION

Field of the Invention

The most well know use of irrigation is the application of water to growing plants for agricultural crops and landscape maintenance. Irrigation systems are also used for supplying chemical for weed growth, frost protection of crops, cooling livestock, dust suppression and in mining. Irrigation has been used in agriculture for over 5000 years in various forms.

There are several types of irrigation including surface irrigation, micro-irrigation, drip irrigation and sprinkler irrigation.

The oldest form of irrigation is surface irrigation, also know as flood, furrow or level basin irrigation. The water is applied and distributed over the soil by gravity.

In micro-irrigation, also known as localized, low volume or trickle irrigation, the water is distributed under low pressure through a piped network and applied as a small discharge near each plant.

In sprinkler irrigation, also known as overhead irrigation, the water is distributed to the plants or by overhead high-pressure sprinklers. Sprinkler irrigation systems can be fixed in place, referred to as solid-set irrigation system, or as traveling sprinkler systems connected to a water source via hose.

The present invention is a device design to test the function of an individual sprinkler head separate from the irrigation system. The invention functions by pumping water from a small reservoir to the sprinkler head, whereby the spray of water from the sprinkler head may be observed.

Description of Related Art

The Fuel Injector Testing Device (U.S. Pat. No. 4,712,421 issued Dec. 15, 1987 to Jeffrey H. Young) describes a device for the testing of a fuel injector nozzle. The invention supplies a test fluid to the fuel injector to test the fuel spray pattern of the injector. The device includes a reservoir for the test fluid and a pumping apparatus to send the test flue to the injector.

The Spray Distribution Measuring Device and Measuring Method (U.S. Pat. No. 6,053,037 issued Apr. 25, 2000 to Shinji Kojima and Osamu Matsumoto), like the above noted invention, is also designed for the testing of a fuel injection system. It differs from the above invention in that the Kojima invention collects the test fluid as it is emitted from the fuel injectors and measure the and calculates the spray distribution.

BRIEF SUMMARY OF THE INVENTION

The invention disclosed in this application is a device to individually test irrigation sprinkler heads. The invention is comprised of a cabinet with a water reservoir and submersible pump. The submersible pump is located in water reservoir in the bottom of the cabinet. The top section of the cabinet is equipped with doors with transparent panels to observe the sprinkler head as it is being tested.

The submersible pump pumps water from the cabinet reservoir to the sprinkler head being tested. The spray of water emitted from the sprinkler head may be observed through the transparent door panels. Water emitted from the sprinkler head drains back into the cabinet reservoir so that it may be reused. In some embodiments of the invention, a fluorescent liquid may be used as the testing fluid for the sprinkler head to aid in the determination of faults in the sprinkler head. A black light is provided in the cabinet for this purpose.

DETAILED DESCRIPTION OF THE INVENTION

Figure 1:
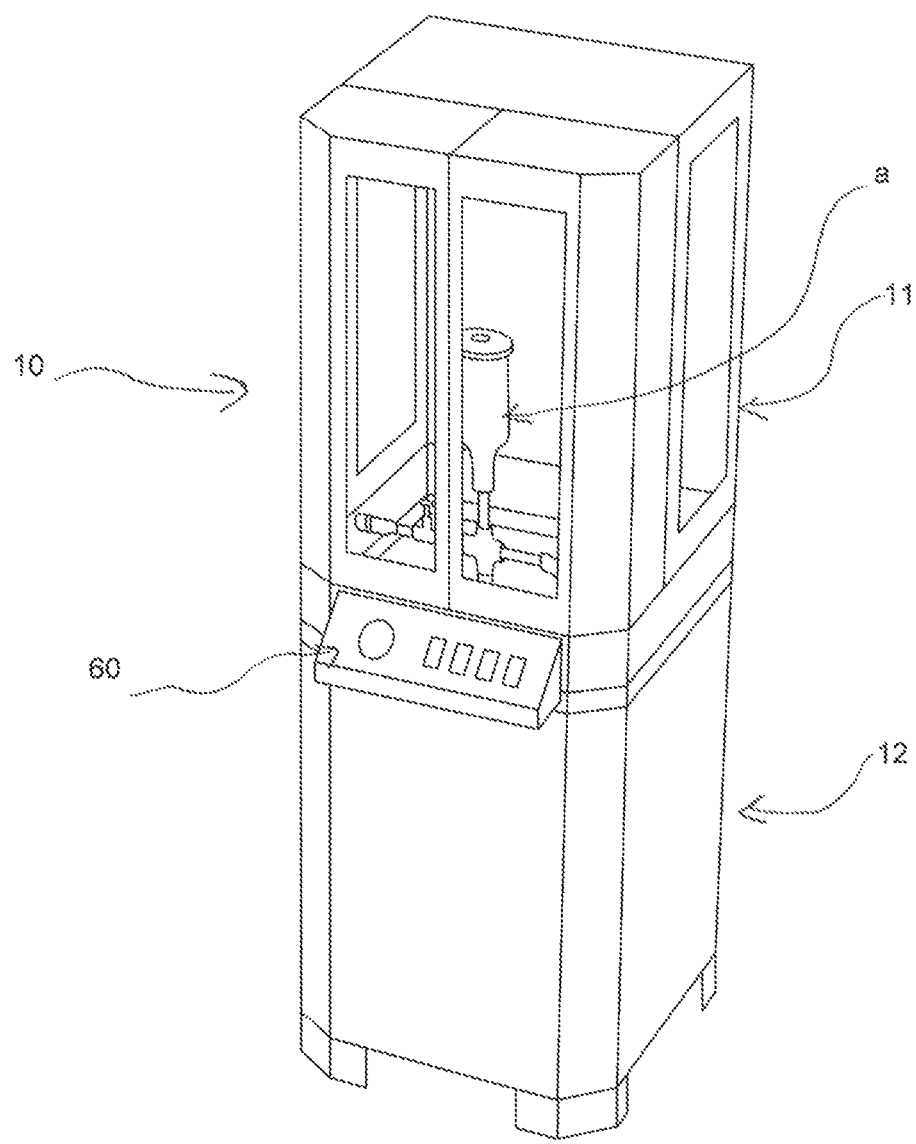
FIG. 1 depicts the cabinet (10) with a sprinkler head (a) visible inside the testing chamber (11), below the testing chamber (11) is the water reservoir (12). On the front of the cabinet is the control panel (60) for the pump, lights and sprinkler head solenoid.

The invention disclosed in this application is a device to individually test irrigation sprinkler heads. The invention is comprised of a cabinet (10) with a water reservoir (12) and submersible pump (20). The submersible pump (20) is located in water reservoir (12) in the bottom section of the cabinet (10). The top section of the cabinet serves as the testing chamber (11) is equipped with doors (13) with transparent panels (14).

The submersible pump (20) supplies the motive force for the water supply to the sprinkler to be tested. The cabinet is equipped with a power connection point (21) to supply electricity via the pump's power supply line (24) to the submersible pump (20). An On/Off switch (22) for the submersible pump are located on the front of the cabinet on the control panel (60).

The submersible pump (20) discharge is connected to a piping arrangement (27) that includes an air eliminator (33), a connection point (25) for the sprinkler head, a pressure transmitter (30) and a pressure safety relief valve (32). The connection point (25) for the sprinkler head is a cam lock coupler to allow for quick connect and disconnect of the sprinkler head being tested. A metal bar is connected to the connection point (25) for the sprinkler head and the ends of the metal bar affixed to the cabinet walls, this is to provide additional stability for the sprinkler head being tested and lessen the strain on the submersible pump (20) and its discharge piping.

The bottom section of the cabinet (10) is a water reservoir (12) for the submersible pump (20). Water may be added to the reservoir (12) via the water inlet port (15) on the side of the cabinet. Water may be drained from the reservoir via the drain port (16) on bottom section of the cabinet.

A light (17) is located on the back section of the cabinet (10) so that the testing chamber (11) of the cabinet (10) may be illuminated when a sprinkler head is being tested. An On/Off Switch (18) for the light (17) is located on the control panel (60) on the front of the cabinet. In some embodiments of the invention, a black light (40) is provided in addition to the cabinet light (17). The black light (40) is utilized when a fluorescent liquid is used as the testing fluid. An On/Off Switch (41) is provided for the black light (40).

Some sprinkler heads being tested may include an electrically powered solenoid. For testing these types of sprinkler heads a connection to the electrical power supply and an On/Off Switch (61) is provided.

A component control panel (60) is located on the front of the cabinet (10) with a pressure indicator (35) of the submersible pump discharge pressure, an On/Off Switch (22) for the submersible pump (20), an On/Off Switch (18) for the cabinet light (17), an On/Off Switch (41) for the black light (40) and an On/Off Switch (61) for the sprinkler head solenoid.

The doors (13) of the cabinet are closed when a sprinkler head is being tested in the testing chamber (11) for safety purposes. The transparent panels (14) in the doors (13) allow the water spray to be observed. Water from the sprinkler is drained into the reservoir (12) where it may be reused.

The cabinet (10) may be constructed of a variety of materials including organic and inorganic polymers, wood, metal or metal alloys. The transparent panels (14) in the cabinet doors (13) may be constructed of glass or other commercially available transparent material. Hinges on the cabinet door (10) are commercially available. The preferred embodiment of the invention utilizes plastic for the cabinet (10) and plexiglass for the transparent door panels (14).

The submersible pump (20) may be any number of commercially available submersible pump. The preferred embodiment of the invention utilizes a 115V Deep Well submersible pump. The light, black light, piping, couplers, switches, wiring, pressure transmitter and readout, and inlet and outlet water ports may all be commercially available components.

Figure 2:
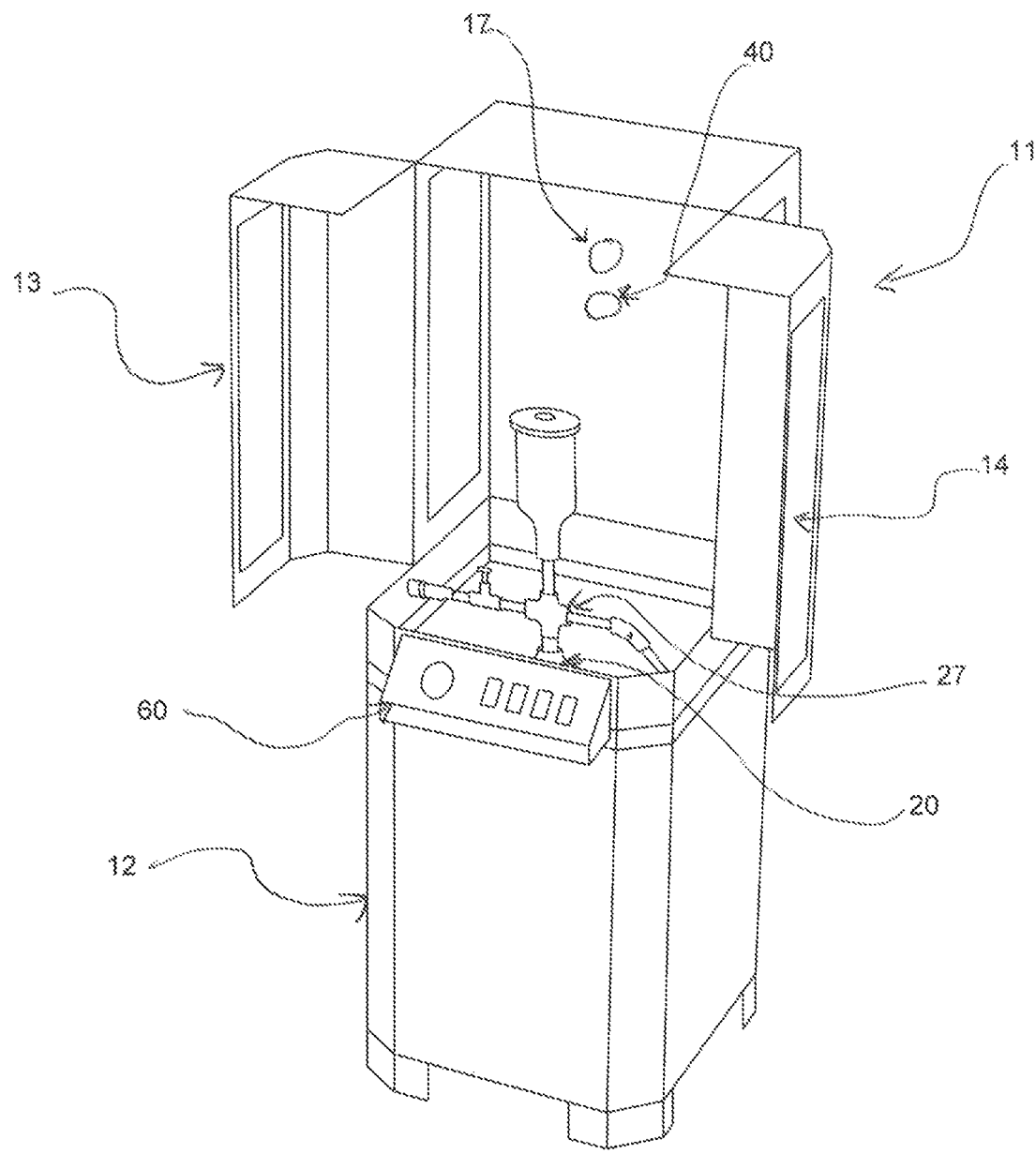
FIG. 2 depicts the cabinet (10) with the testing chamber (11) doors (13) with transparent panels (14) open, inside the cabinet on the back panel of the testing chamber are a light (17) and a black light (40). The sprinkler head (a) is affixed to the discharge piping arrangement (27) of the submersible pump (20).
Figure 3:
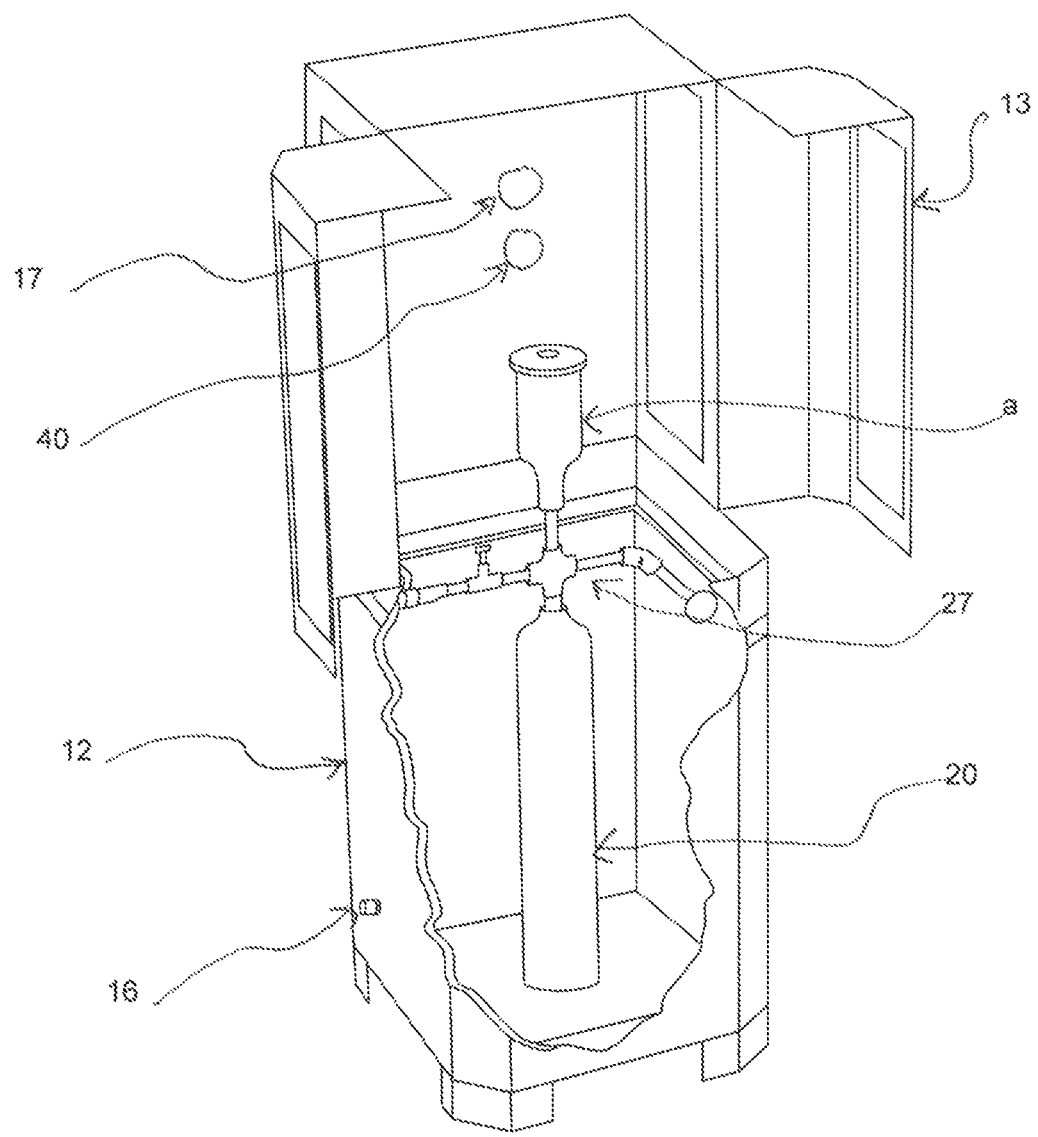
FIG. 3 is a cutaway drawing of the water reservoir (12) section of the cabinet (10) showing the submersible pump (20) and its discharge piping arrangement (27) to which a sprinkler head (a) is affixed. On the side of the water reservoir (12) is a water drain port (16).
Figure 4:
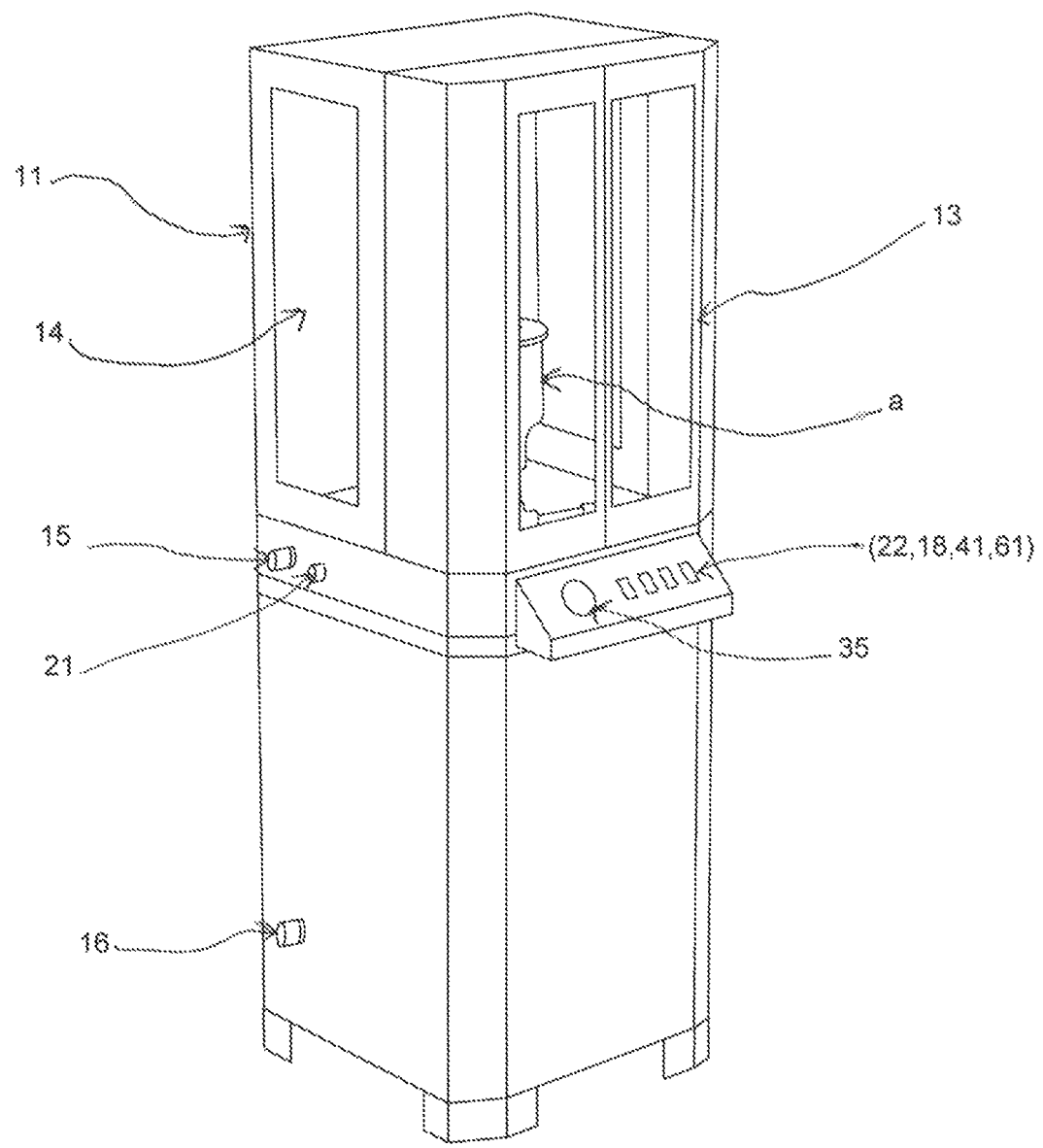
FIG. 4 depicts a side view of the invention with the transparent panels (14) of the testing chamber (11) doors (13), the water inlet port (15) and the water drain port (16) for the water reservoir (12) and the power connection point (21). On the front of the cabinet is the control panel (60) with the submersible pump discharge pressure indicator (35) and the on/off switches (22, 18, 41, 61) for the submersible pump, light, black light and sprinkler head solenoid.
Figure 5:
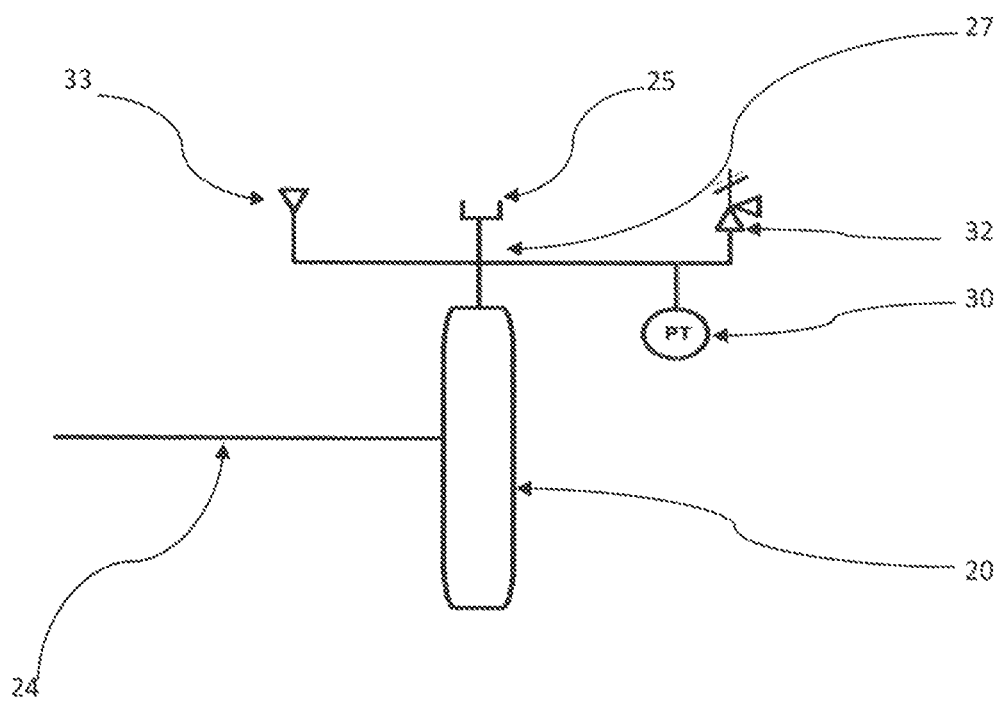
FIG. 5 depicts the submersible Pump (20) with its power supply line (24) and the discharge piping arrangement (27) including the pressure transmitter (30), air eliminator (33), sprinkler head connection (25) and pressure safety relief valve (32).

Potential patent classifications for this invention include:
Class 73: Measuring and Testing
   Subclass 861: Volume or Rate of Flow;
   Subclass 865.6: Simulated Environment; or
   Subclass 432.1: Miscellaneous The present invention described above and illustrated in FIGS. 1 through 4 is visualized as the preferred embodiment of the invention. It is envisioned that this invention may be embodied in many different forms and should not be construed as limited to the embodiments set forth herein. It will be understood by those skilled in the art that changes in forms and details may be made without departing from the spirit and scope of the present application. It is therefore intended that the present invention not be limited to the exact forms and details described and illustrated herein but falls within the scope of the appended claims.

The terminology used herein is for describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a stricture or feature that is disposed "adjacent" another feature may have portions that overlap or underlie the adjacent feature.

The invention claimed is:

1. A test device for an irrigation sprinkler head comprising a two sectioned cabinet having a cabinet upper section and a cabinet lower section, a submersible pump, a light, a connection for said irrigation sprinkler head, electrical power connections for said light, said submersible pump and said irrigation sprinkler head; wherein said cabinet upper section is a testing chamber with doors that are further comprised of transparent panels through which an output of said irrigation sprinkler head may be observed; wherein said cabinet lower section is a water reservoir containing said submersible pump and said lower section is further equipped with a water inlet port and a water drain port; wherein said submersible pump is connected to a discharge piping arrangement equipped with an air eliminator, said connection for said irrigation sprinkler head, a pressure safety relief valve and a pressure transmitter; and wherein the front of said cabinet is further equipped with on/off switches for said submersible pump, said light and said irrigation sprinkler head and a pressure indicator for said pressure transmitter.

2. The device of claim 1, wherein said cabinet is further equipped with a black light for observing said output of said irrigation sprinkler head when a fluorescent fluid is used in place of water as a testing medium.

* * * * *